United States Patent [19]

Mukadam et al.

[11] Patent Number: 5,299,530
[45] Date of Patent: Apr. 5, 1994

[54] SUBMERGIBLE FISH CAGE

[75] Inventors: Hasham Mukadam, Northridge; John W. Morgan, Pacific Palisades, both of Calif.

[73] Assignee: Occidental Research Corporation, Los Angeles, Calif.

[21] Appl. No.: 917,853

[22] Filed: Jul. 17, 1992

[51] Int. Cl.$^5$ ...................... A01K 63/00; A01K 61/02
[52] U.S. Cl. .................. 119/223; 119/51.04
[58] Field of Search ................ 119/2, 3, 4, 51.04

[56] References Cited

U.S. PATENT DOCUMENTS

| | | |
|---|---|---|
| D. 254,503 | 3/1980 | Belasquez ............... D22/18 |
| 699,084 | 4/1902 | Dill . |
| 1,336,356 | 4/1920 | Johnson . |
| 1,800,592 | 4/1931 | Blomquist . |
| 1,841,956 | 1/1932 | Juergens . |
| 2,241,314 | 5/1941 | Mohler ............... 43/55 |
| 2,603,028 | 7/1952 | Roberts ............... 43/55 |
| 2,739,410 | 3/1956 | Budnick ............... 43/55 |
| 2,966,885 | 1/1961 | Bentley ............... 119/51.04 |
| 3,478,463 | 11/1969 | Ruter ............... 43/55 |
| 3,698,359 | 10/1972 | Fremont ............... 119/3 |
| 3,717,124 | 2/1973 | Jacobs ............... 43/55 X |
| 3,919,803 | 11/1975 | Manguso ............... 43/55 |
| 4,013,042 | 3/1977 | Ingold ............... 119/3 |
| 4,079,698 | 3/1978 | Neff et al. ............... 119/3 |
| 4,084,543 | 4/1978 | Pequenat ............... 119/3 |
| 4,086,874 | 5/1978 | Sterner ............... 119/3 |
| 4,092,797 | 6/1978 | Azurin ............... 43/102 |
| 4,186,687 | 2/1980 | Gilpatric ............... 119/4 |
| 4,231,322 | 11/1980 | Gilpatric ............... 119/4 |
| 4,244,323 | 1/1981 | Morimura ............... 119/3 |
| 4,257,350 | 3/1981 | Streichenberger ............... 119/3 |
| 4,373,286 | 2/1988 | Robison ............... 43/10 |
| 4,437,259 | 3/1984 | Holyoak ............... 43/105 |
| 4,610,219 | 9/1986 | Morimura ............... 119/3 |
| 4,615,301 | 10/1986 | Maekawa et al. ............... 119/3 |
| 4,716,854 | 1/1988 | Bourdon ............... 119/3 |
| 4,766,846 | 8/1988 | Lavoie ............... 119/3 X |
| 4,798,169 | 1/1989 | Rosen et al. ............... 119/3 |
| 4,876,985 | 10/1989 | Marcum et al. ............... 119/4 |
| 4,886,015 | 12/1989 | Ochs ............... 119/3 |
| 4,890,413 | 1/1990 | Nelson et al. ............... 43/55 |
| 4,903,429 | 2/1990 | Tetenes ............... 43/44.99 |
| 4,905,404 | 3/1990 | Pasion et al. ............... 43/55 |
| 4,914,856 | 4/1990 | Kennedy ............... 43/55 |
| 4,957,064 | 9/1990 | Koma ............... 119/3 |
| 5,007,376 | 4/1991 | Loverich et al. ............... 119/3 |
| 5,009,189 | 4/1991 | Neff ............... 119/3 |

FOREIGN PATENT DOCUMENTS 8204379 12/1982 PCT Int'l Appl. ............... 119/51.04

Primary Examiner—Robert P. Swiatek
Attorney, Agent, or Firm—Harness, Dickey & Pierce

[57] ABSTRACT

A submergible fish cage comprising: a float; a fish cage; at least one (1) anchor weight; and at least one (1) cable, one end of the cable attached to the float element, a middle portion of the cable attached to the fish cage, the bottom end of the cable attached to the anchor element, the cable being shorter than the depth of the water in which the submergible fish cage is placed; the float having a trim tank adapted to be flooded with water, the trim tank adapted to be blown free of water with air, the float element having a minimum of buoyancy sufficient to float itself supporting the fish cage and cable when the trim tank is flooded with water, the float element having a maximum of buoyancy sufficient to float itself supporting the fish cage, anchor weight and cable when the trim tank is charged with air; and the anchor weight having sufficient weight to submerge the float, cage, cable and anchor weight when the trim tank is flooded with water.

23 Claims, 11 Drawing Sheets

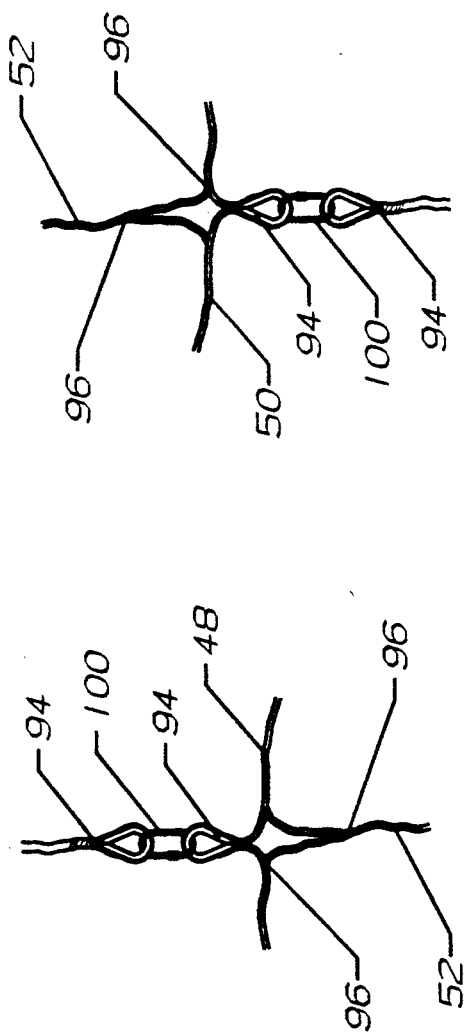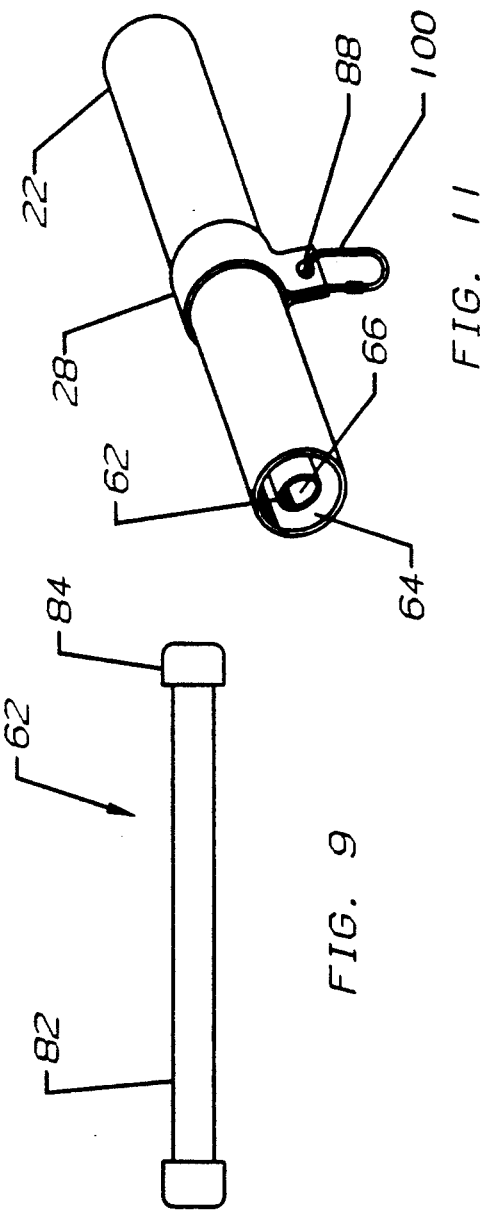

SUBMERGIBLE FISH CAGE

BACKGROUND OF THE INVENTION

The present invention is directed to a system and device for the aqua farming of fish in open bodies of water. At the present time, most fish farm systems employ ponds and/or tanks to raise fresh water and salt water fish. These operations are successful but have several drawbacks. Such systems have a fairly high capital requirement for the purchase or lease of the land and for the construction of the ponds and tanks which must be fabricated of materials resistant to the corrosive effects of fresh or salt water. The operation of the tanks and ponds are also expensive because the water quality of the ponds and tanks must be carefully controlled. If the water quality is allowed to deviate from the normal, the growth rate and health of the fish is dramatically affected. In fact if the water quality is not strictly controlled, the growth rate of the fish decreases and the mortality rate increases. A further disadvantage of raising fish in ponds and tanks arises from the health considerations. Fish are subject to a number of diseases. Once a tank or pond is infected, it is virtually impossible to save the fish being raised in the pond or tank. A further disadvantage associated with tanks and ponds is their susceptibility to temperature fluctuations caused by weather conditions. During hot spells, the water temperature of a tank or pond can reach 80° F. or more unless the water is cooled or flushed with cool water. Several years ago, ponds in Texas were subject to a prolonged hot spell and it caused the pond water temperature to raise—most of the ponds did not have water cooling facilities—and large fish kills resulted from the elevated pond water temperatures. During freezing spells, the water temperature of a tank or pond can drop to near freezing unless the water is heated or flushed with warm water. There have been incidences during cold spells in Texas, Mississippi and Louisiana where pond water temperature has dropped to near freezing resulting in large fish kills. Even when the water temperature does not reach the extremes of 80° or 32° F., warm or cool water temperatures can adversely affect the fish growth rate. Another problem associated with the construction and operation of artificial ponds and tanks is the availability of water and the disposal of byproducts. Ponds require an initial charge of water to fill and require make-up water and flush water during the operation in order to maintain the minimum quality of water for fish growth. Tanks also require an initial charge of water and make up water during operation. If the tank has a water treatment set-up, the water does not have to be flushed but make up water is required and if the salt and/or minerals content of the water builds up, the water must be diluted with fresh water. Solids filter out of the water must be disposed of in an environmentally acceptable manner.

Because of these problems, a number of attempts have been made to raise fish in open bodies of water, such as in the ocean and in large lakes. The waters of the open bodies of water, because of currents and the winds, are constantly being churned so that the water does not stagnate. This is an ideal environment for the raising of fish. However, the raising of fish in an open body of water has its own difficulties including caging the fish, harvesting the fish from the cages, feeding the fish, and protecting the fish cage and the fish therein from actions of current, waves and wind on the open bodies of water.

SUMMARY OF THE INVENTION

Applicants have found that the offshore oil well platforms after shut down of the oil and/or gas production make ideal anchor points and operational points for aqua farming. A conventional fish feeding system can be installed on the platform. The platforms have the facilities for receiving personnel, equipment and supplies by boat and/or helicopter. The platforms have facilities for occupation by operating personnel and the platforms are designed to withstand high winds, water currents, wave actions and storms, including hurricanes. Although the present invention is conveniently operated adjacent to an off-shore oil well platform, the invention can be operated in the absence of a platform. For example, the present invention can be operated in a bay, ocean, lake or inlet with the device being anchored to the sea bottom or lake bottom or alternatively anchored to floating buoys or piers which are anchored to the sea bottom or ocean bottom. In the event the invention is operated in the absence of a platform, feeding of the fish is conducted from a boat, barge or the like and the equipment required for raising and lowering the present invention in the water will be carried on a boat, barge or the like.

The submergible fish cage of the present invention comprises:

an enclosed net cage having a continuous side wall, a contiguous top wall and a contiguous bottom wall;

a hollow flotation ring having at least one chamber within the ring, a plurality of water openings on the bottom of the ring for fluid communication between each chamber and the exterior of the ring, and a plurality of inlets on the ring in fluid communication with the chambers for pumping air into or evacuating air out of the chambers;

at least one flotation element positioned within and about the ring, each flotation element having positive buoyancy in water, the flotation elements giving the ring sufficient buoyancy when the chambers of the ring are flooded with water to support the ring and the enclosed net cage, a flotation element positioned within at least one chamber;

a plurality of anchor weights, sufficient anchor weights being employed so that anchor weights will submerge the ring and enclosed net cage when the central chamber of the ring is fully flooded; and a plurality of cables attached at their upper end to the ring, the middle portion of the cable attached to the enclosed net cage and the bottom end of the cables below the bottom wall of the enclosed cage attached to the anchor weights, the ring having sufficient buoyancy when water is expelled from the chambers to rise to the surface of a body of water with the enclosed net cage, anchor weights and cables. Preferably, each cable will be made up of cable sections with each cable section being interconnected by a connector such as a quick connect/disconnect cable link or coupler so that anchors or anchor cable can be quickly connected or disconnected to the system, the hollow flotation ring can be easily connected or disconnected to the system, and/or the enclosed fish cage can be easily connected or disconnected to the system.

The submergible fish cage flotation ring preferably has a support collar positioned approximately in the center thereof with at least three support arms extending from the ring to the support collar, the collar adapted to receive a fish feed tube which is connected to the top wall of the enclosed net cage for introducing fish food into the cage from a fish feed supply.

The submergible fish cage enclosed net cage has a cable ring at the juncture of the top wall with the continuous side wall of the enclosed cage, the cables attached to the ring being secured to the cable ring and the cable ring being attached to the cables attached to the anchor weights.

The submergible fish cage preferably includes an air manifold system for the ring comprising at least one inlet in the ring in communication with each chamber and in communication with the air manifold system which is connected to an air supply system which can inject air into the manifold system to deliver air into each chamber to expel water from each chamber and which can permit the evacuation of air from each chamber to permit water to flood each chamber. For flotation rings having a single chamber extending around the ring, the air manifold system will have at least two (2) orifices connecting the air manifold to the central chamber located on opposite sides of the ring. Preferably, the air manifold system will include at least four (4) air supply inlets located on four (4) sides of the ring equal distant from each other. The air manifold system can be mounted on the bottom of the ring, on the inside of the ring, on the outside of the ring or on top of the ring. The manifold system will be protected somewhat by the ring if the manifold system is located on the inner side of the ring.

The submergible fish cage preferably includes a water manifold system for the ring comprising at least one aperture in the ring in communication with each chamber and with the water manifold system which is in communication with the body of water and which permits water to enter into the manifold system and enter into each chamber and which permits the expulsion of water from each chamber as air is injected into each chamber. When the ring has a single chamber extending around the length of the ring, the water manifold system preferably has at least two (2) orifices connecting the manifold system with the central chamber. In a two (2) orifice manifold system, the two (2) orifices are preferably located diametrically apart on the ring and equal distant from the air orifices. In a preferred embodiment of the invention, the ring will have at least four (4) orifices connecting the manifold system and the central chamber, with the four (4) orifices being located on the four (4) sides of the ring equal distant from each other and between the air manifold system orifices. The water manifold system, or at least the four (4) orifices between the manifold system and the chamber, are located on the bottom of the ring.

The submergible ring for a fish cage comprises:

a plurality of hollow cylindrical sections connected together by like plurality of hollow elbows, the end of each straight section connected to an end of a separate elbow to form a continuous ring;

a plurality of flotation elements positioned within the central chamber of the straight sections, the flotation elements distributed evenly about the ring;

one or more sections having a port in communication with the central chamber and the exterior of the ring to permit water to enter into the central chamber when air is removed from the central chamber and to provide for the expulsion of water from the central chamber when air is introduced into the central chamber;

one or more sections having a second port in communication with the central chamber for introducing air into the central chamber to expel water from the central chamber and to permit evacuation of air from the central chamber to permit the entrance of water into the central chamber;

the flotation elements having sufficient buoyancy to at least float the ring with its attached fish net cage but not the anchor weights attached thereto when the central chamber of the ring is fully flooded with water; and the ring having sufficient buoyancy when water is expelled from the central chamber to raise the ring attached to the fish net cage, cables and anchor weights to the surface of the water.

The flotation ring straight sections are preferably butt welded to the ends of the elbows.

The flotation ring flotation elements preferably comprise a hollow pipe-shaped element having an OD diameter less than the ID diameter of the central chamber, the ends of each pipe-shaped element being sealed off with caps.

The flotation ring preferably has alternating straight sections with first ports connected to a water manifold system, the ports communicating with the central chamber and the manifold system, the water manifold system having at least one outlet/inlet for expelling water from the central chamber and introducing water into the central chamber.

The flotation ring preferably has the other alternating second straight sections with second ports connected to an air manifold system, the ports communicating with the air manifold system and with the central chamber, the air manifold system having at least one air inlet/outlet for injecting air into the central chamber and for evacuating air from the central chamber.

The flotation ring preferably has a cylindrical collar positioned in the approximate middle of the ring, the collar being supported by at least three struts extending from the wall of the ring to the exterior wall of the collar to secure and position the collar.

The flotation ring is preferably made of eight straight sections which are connected and assembled into a regular polygonal ring, i.e. an octagon, by eight 45° elbows secured to the ends of the straight sections to form a regular octagon ring.

The flotation ring preferably includes a plurality of straps secured around the straight sections about the ring, the ends of the straps secured together with a grommet to which the cables can be attached.

An aqua farming system for a body of water of the present invention comprises:

a platform extending above the surface of the body of water;

an air system on the platform;

a fish feed system on the platform for supplying fish feed to the fish;

an enclosed net cage for impounding a plurality of fish for raising the fish for harvest;

a fish feed tube connecting the fish feed system to the enclosed net cage to convey fish feed from the fish feed system to the interior of the cage; and lines connecting the enclosed net cage and the platform and lines connecting the enclosed net cage and anchors embedded in the bottom of the body of water to maintain the relative position of the enclosed net cage with the platform.

The present system possesses a number of advantages over existing systems for raising fish in open bodies of water. The system requires a minimum amount of equipment. The submergible fish cage is made of flexible plastic piping which bends to absorb the forces of the wind, wave action and currents. In addition, the flotation ring is sufficiently flexible to withstand a fair degree of jarring from collisions with piers, boats and the like. The entire system is sacrificial, that is, if the system should break from its moorings and anchors, and collide with a platform or boat, it will not harm the platform or boat because of the system's flexibility and light weight. The system is virtually free of metal so that corrosion is minimized. The system has no mechanical joints which require maintenance and inspection. The system can use a compressed air supply to raise the system so that an air supply does not have to be maintained on a platform or rig, but can be placed on a boat or helicopter to be used when the system is to be raised to the surface. The system is made of conventional materials readily available in the marketplace. The system components can be quickly fabricated and the total system can be quickly assembled using cable and quick connect connectors or links. The system cannot fully sink because the top flotation ring at least has positive buoyancy, even when fully flooded and can support itself, the fish cage and cables. Thus, even if a ring is fully flooded, the top flotation ring with the enclosed net case will not sink to the bottom. The system when submerged lies below the surface of the water and does not hinder navigation because ships can cross over the submerged fish cages.

BRIEF DESCRIPTION OF THE DRAWINGS

FIG. 9 is a plan view of a flotation element located within the ring of FIG. 3.

FIG. 11 is a partial sectional view of a segment of the ring of FIG. 3;

FIG. 13 is an enlarged view of the encircled portion 13 of FIG. 12;

FIG. 14 is an enlarged view of the encircled portion 14 of FIG. 12;

DESCRIPTION OF THE PREFERRED EMBODIMENT OF THE INVENTION

Figure 1:
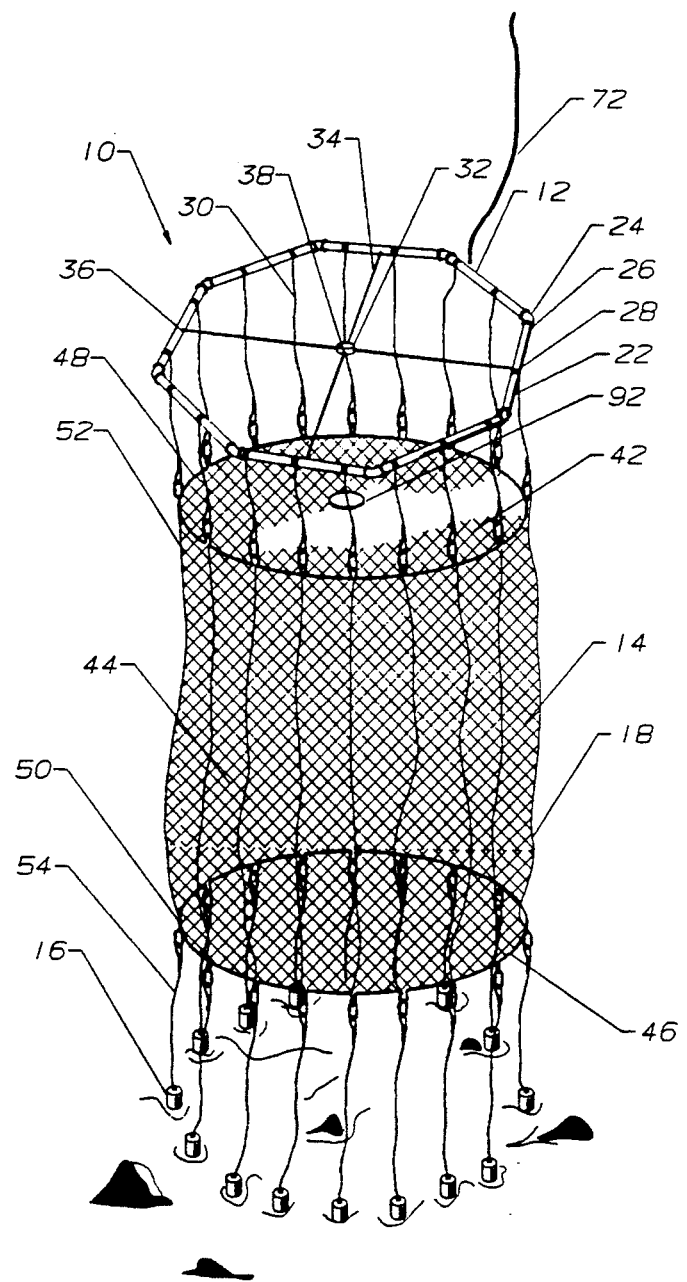
FIG. 1 is a three quarter perspective view of the submergible fish cage of the present invention.
Figure 2:
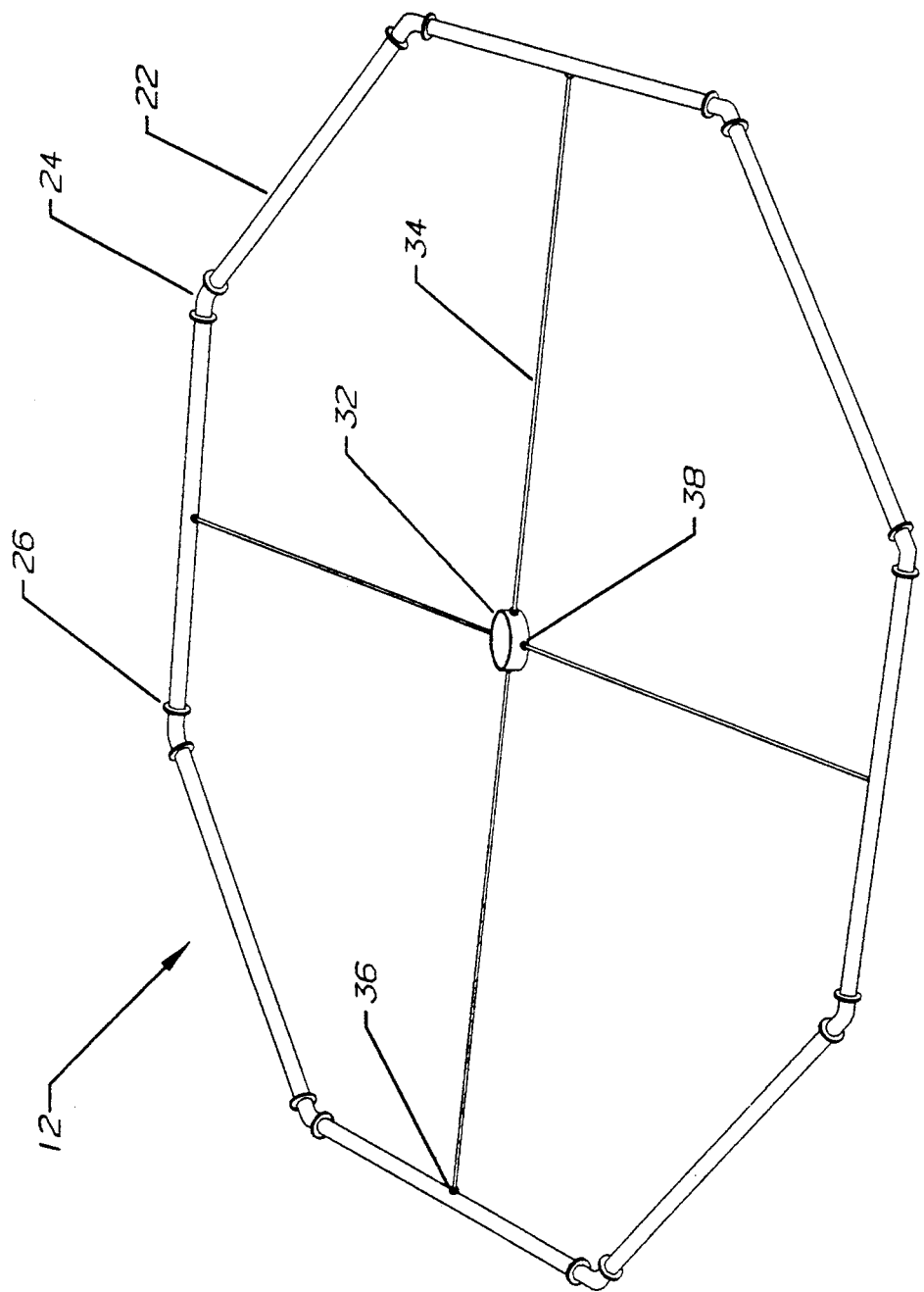
FIG. 2 is a perspective view of the flotation ring of the submergible fish cage of FIG. 1.

Referring to FIG. 1, the submergible fish cage 10 comprises a flotation ring 12, an enclosed net cage 14 made of fish net, anchor weights 16 and cables 18 which interconnect the flotation ring, enclosed net cage and anchor weights. The flotation ring comprises a plurality of straight hollow pipe sections 22 which are connected with 45° pipe elbows 24. Conveniently, the ring may be made of readily available high or medium density polyethylene or polypropylene pipe and high or medium density polyethylene or polypropylene 45° elbows. For a ring of 30 ft. diameter, we propose to use 6 inch OD piping and for rings having a diameter of greater that 30 ft., we propose to use larger piping such as 8 inch or 12 inch OD piping. We have found that Uponor Aldyl brand gas pipe, Uponor Aldyl brand gas pipe fittings and the Uponor butt welders, socket welders and saddle welders can be used to advantage in fabricating the flotation ring and other piping components. However, undoubtedly other brands of thermoplastic material can be used in construction of the flotation ring. Fresh water and salt water have little effect on polyethylene and polypropylene thermo plastics and these are excellent materials for the piping used in the invention. The elbows and pipe sections may be butt welded to form butt joints 26. A collar 32 is positioned at the center of rotation of the ring and supported by hollow pipe segments 34 which are secured by branch saddles 36 on the exterior wall of the ring and by branch saddles 38 on the exterior of the collar. The collar positions the fish feed tube, which will be described hereinafter, with respect to the enclosed net cage.

The enclosed net cage 14 is made from fish net mesh. The netting can be made of natural fibers, synthetic fibers or metal cable. Conventional synthetic fiber fish net is conveniently used and a mesh size, such as ½ inch, is chosen so that fish fingerlings inserted into the enclosed net cage cannot escape. The net cage also keeps out most predators from the fish within the cage as they grow. It is anticipated that the fish within the net cage will be harvested every nine to twelve months. Because of the lengthy submergence time of the net material in the water, it is preferred that the net fiber be made of a synthetic material which is resistant to fresh water and salt water. Conventional, modern fish net fibers such as, nylon fibers, and the like, are preferred because they are less susceptible to biofouling than natural fish net fibers. Because the enclosed net cage is maintained below the surface of the water, UV degradation and oxygen degradation of the net material is slight.

The enclosed net cage has a top wall 42 joined to a side wall 44 which in turn is joined to the bottom wall 46. The enclosed net cage can have one or more entry flaps or walls located on the top or side. Although the enclosed net cage is shown as a cylindrical element having a planar top and bottom, the enclosed net cage can have a variety of shapes, and the top and bottom walls can be hemispherical, funnel-shaped or the like. The bottom wall 46 may have a funnel shape with a closure at the tip of the funnel so that when the fish within the enclosed net cage are to be harvested, the enclosed net cage can be lifted out of the water, positioned over a receptacle, such as, a barge or fishing vessel, and the closure at the bottom of the funnel-shaped bottom wall 46 opened to direct the fish into the receptacle. The cage can also be polygonal shape. At the present time, the applicants have not determined what is the optimal shape for the enclosed net cage.

The enclosed net cage is preferably reinforced with a head cable ring 48 and a bottom cable ring 50. Cables 18 extend from the ring down to the anchor weights 16. The top cable section 30 of cable 18 is connected to the ring by straps 28 which are more fully illustrated in FIG. 11. The middle cable section 52 of cable 18 is connected to the side wall 44 of the enclosed net cage. The bottom cable section 54 of cable 18 is connected to the anchor weights 16. The cable 18 is attached to the head cable ring 48 and to the bottom cable ring 50 as further explained with reference to FIGS. 13 and 14.

Referring to FIGS. 3 through 9, the flotation ring 12 has a hollow central chamber 64 which extends the full length or circumference of the pipe sections 22 and elbows 24 of the ring. Positioned within the ring are flotation elements 62. The flotation elements can be any type of device which is buoyant in water. Conveniently, the flotation elements are hollow polyethylene or polypropylene pipe sections 82. When the flotation ring is fabricated from nominal 6 inch OD piping, the flotation elements are made from nominal 3 inch OD piping. When the flotation ring is fabricated from nominal 8 inch OD piping, the flotation elements can be fabricated from nominal 4 inch or 5 inch OD piping. The ends of the pipe section are sealed off with caps 84 which are socket fused or butt welded to the hollow pipe sections 82. Preferably each straight section 22 of the ring contains a flotation element 62. However, it may be possible to have less flotation elements. However, at least a sufficient number of flotation elements will be contained within the flotation ring 12 so that when the central chamber 64 of the ring is fully flooded with water, the ring, because of the flotation elements, will possess sufficient buoyancy to support the ring, the enclosed net cage and cables. The flotation elements are evenly distributed about the ring by having a flotation element in each side or section 22 of the polygonal ring so that the ring floats horizontally and equally supports the fish cage on all sides. The chamber 66 of the hollow pipe section 82 of the flotation element 62 will normally contain air, although the chamber 66 can be filled with a closed foam material, cork, wood, polystyrene foam, polyurethane foam or the like, to minimize or inhibit chance leakage of water into the chamber 66. The flotation element 62 can extend the full length of the section 22 and enter into the central chamber 64 of the elbows 24.

Figure 3:
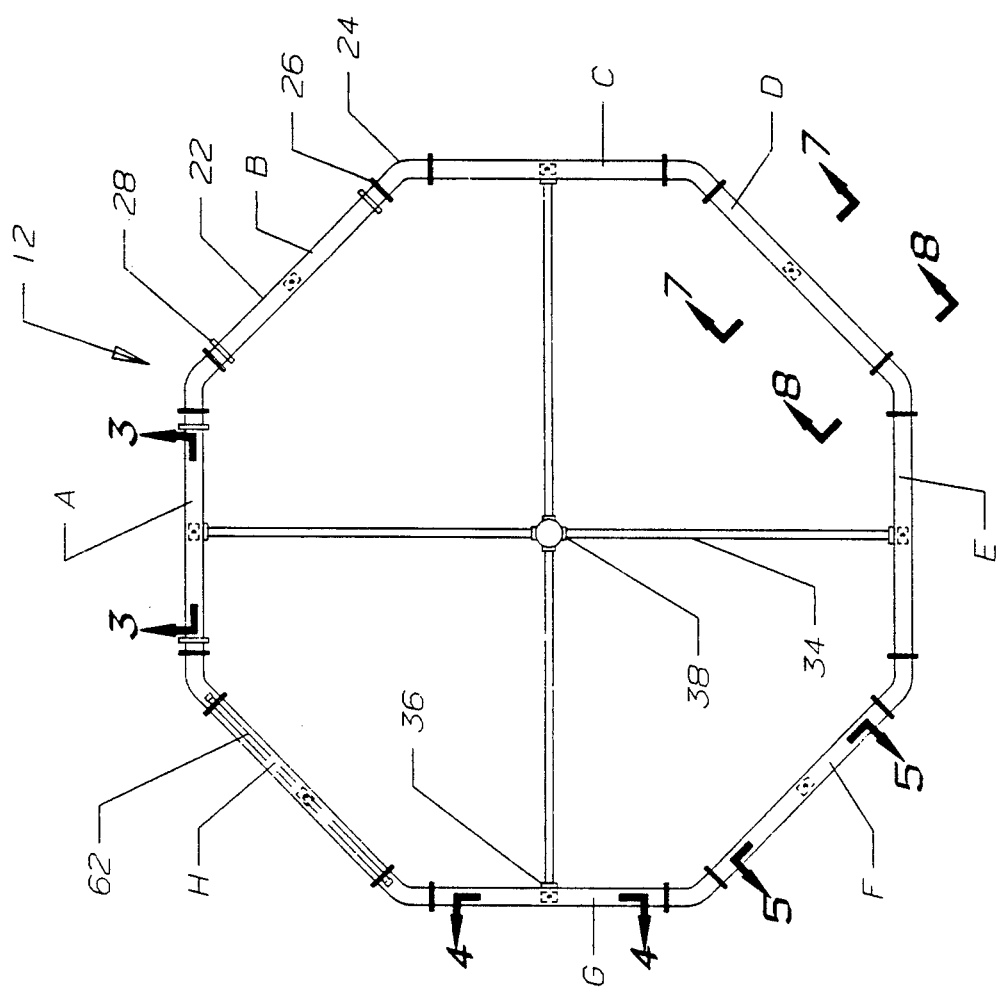
FIG. 3 is a top view of the flotation ring of the submergible fish cage of FIG. 1.
Figure 7:
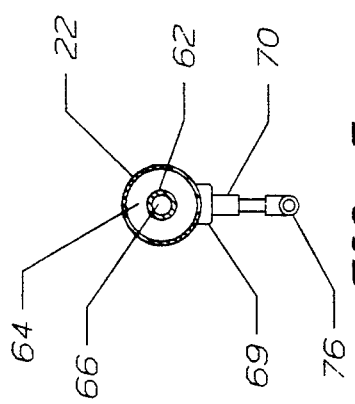
FIG. 7 is a cross-sectional view taken along lines 7—7 of FIG. 3.
Figure 8:
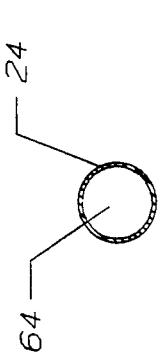
FIG. 8 is a cross-sectional view taken along lines 8—8 of FIG. 3.
Figure 10:
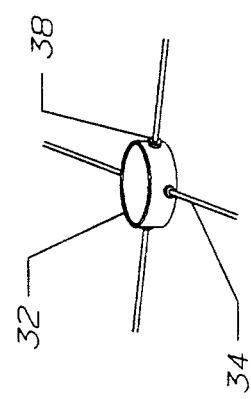
FIG. 10 is a partial three quarter sectional view of the feed tube collar of the ring of FIG. 3.
Figure 6:
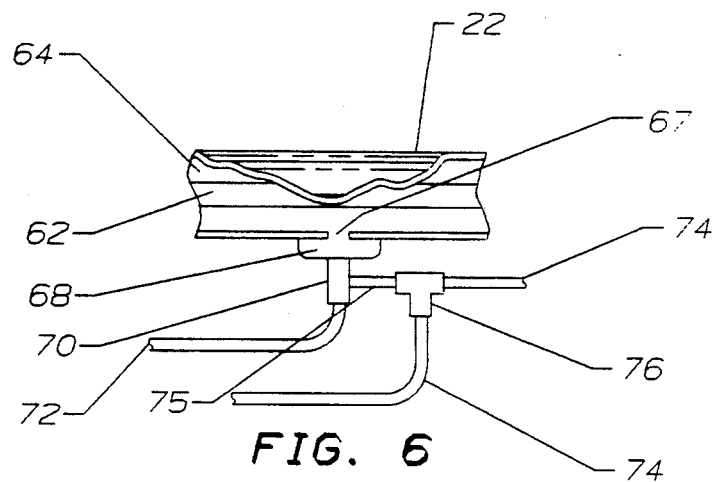
FIG. 6 is a sectional view taken along lines 6—6 of FIG. 3.
Figure 4:
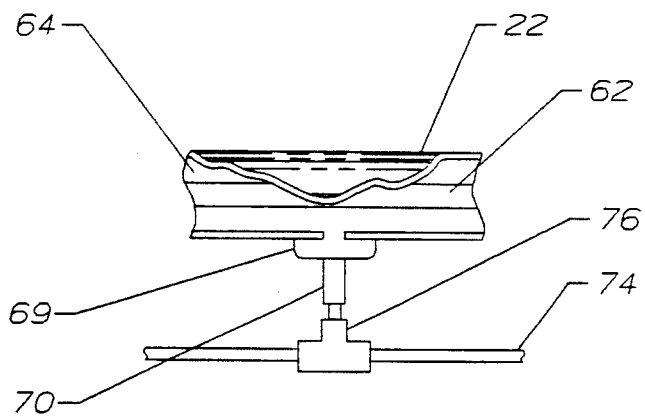
FIG. 4 is a sectional view taken along lines 4—4 of FIG. 3.

Referring to FIG. 6, the bottom of each pipe section 22 of the ring 12 has an orifice 67 which provides communication between the central chamber 64 and the exterior of the ring. Referring to FIG. 3, a saddle-shape pipe tee 68 is welded to the exterior of one pipe section 22 of the ring labelled A in FIG. 3 about orifice 67. Branch saddles 69 are welded on alternate pipe sections 22 of the ring (see FIGS. 4 and 5) and are interconnected as will be described herein to form two (2) manifold systems. The first manifold system is an air manifold system for the introduction or evacuation of air into the central chamber 64 of the ring. The second manifold system is a water manifold system for flooding or evacuating the central chamber 64 with water. Referring to FIG. 6, pipe tee 68 of the air manifold system is connected by its spigot 70 to an air hose 72 which is connected to an air supply system (see FIGS. 17 & 18). The spigot 70 has a branch pipe 75 connected to a tee fitting 76 which in turn is connected to tubing 74. Tubing 74 extends to the other tee fittings 76 connected to branch saddles 69 of alternate sections 22 of the ring of the air manifold system illustrated in FIG. 4. The portion of the manifold system illustrated in FIG. 4 comprise a tee fitting 76 attached to spigot 70 of branch saddle 69; tubing 74 interconnects the tee fittings 76 of the air manifold system. Thus, the air manifold system is connected to the straight hollow pipe sections 22 labeled A, C, E and G in FIG. 3 and the water manifold system is connected to straight hollow pipe sections 22 labeled B, D, F and H of FIG. 3.

Figure 5:
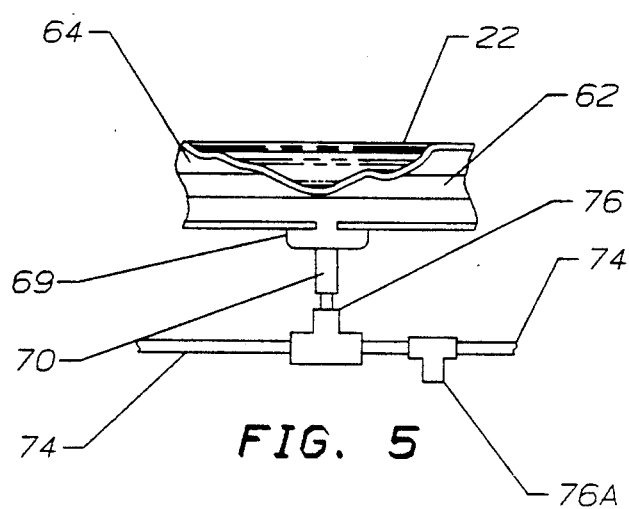
FIG. 5 is a sectional view taken along lines 5—5 of FIG. 3.

Referring to FIG. 5, one straight hollow pipe section 22 of the water manifold system has a pipe tee 69 connected to a tee fitting 76. One side of pipe tee fitting 76 is connected to tubing 74. The other side of pipe tee fitting 76 is connected to a second pipe tee fitting 76A. One branch of fitting 76A is connected to tubing 74 and the other branch 77 exits to the exterior or water. The two sections of tubing 74 illustrated in FIG. 5 connect with the other pipe tee fittings 76 of the water manifold system on alternate straight sections 22. Thus FIG. 5 illustrates a portion of the water manifold attached to straight hollow pipe sections 22 labeled B, the tubing 74 is connected to the adjacent pipe tee fitting 76 attached, via branch saddle 69, to the hollow pipe sections 22 labeled H and D of FIG. 3. The branch saddle 69 of the hollow pipe sections labeled F is connected via tubing 74, pipe tee fittings 76 and branch saddles 69 to the hollow pipe sections labeled H and D of the water manifold system. Except for the water inlet/outlet arrangement shown in FIG. 5, the straight hollow pipe sections 22 labeled D, F and H of the water manifold system have the structure shown in FIG. 4 which has been described above. Conveniently, the tubing 74 and all the fittings 68, 69, 70, 76 and the like are all made of thermo plastic material, preferably the same material that is used in the manufacture of the piping for the flotation ring. Thus, the manifold system can be made with butt welds and with joint welds to connect the fittings, piping and tubing together.

The manifold systems have been designed to provide that the ring is flooded with water or filled with air in such a manner that the ring's buoyancy remains constant around the ring and the ring maintains a horizontal position on top of or within the body of water. Referring to FIG. 11, the top section of the cable 18 is attached to strap 28 wrapped around section 22. The ends of the strap are perforated with a hole and the two ends are secured together by a grommet 88. The top cable section 30 of each cable 18 is attached to a strap through the grommet as explained herein.

The fabricated flotation ring with its air and water manifold systems are very flexible and can bend and flex with the wave action and currents of the water. Because of its high flexibility, the ring does not undergo severe stress because of the water currents and wave action.

Figure 12:
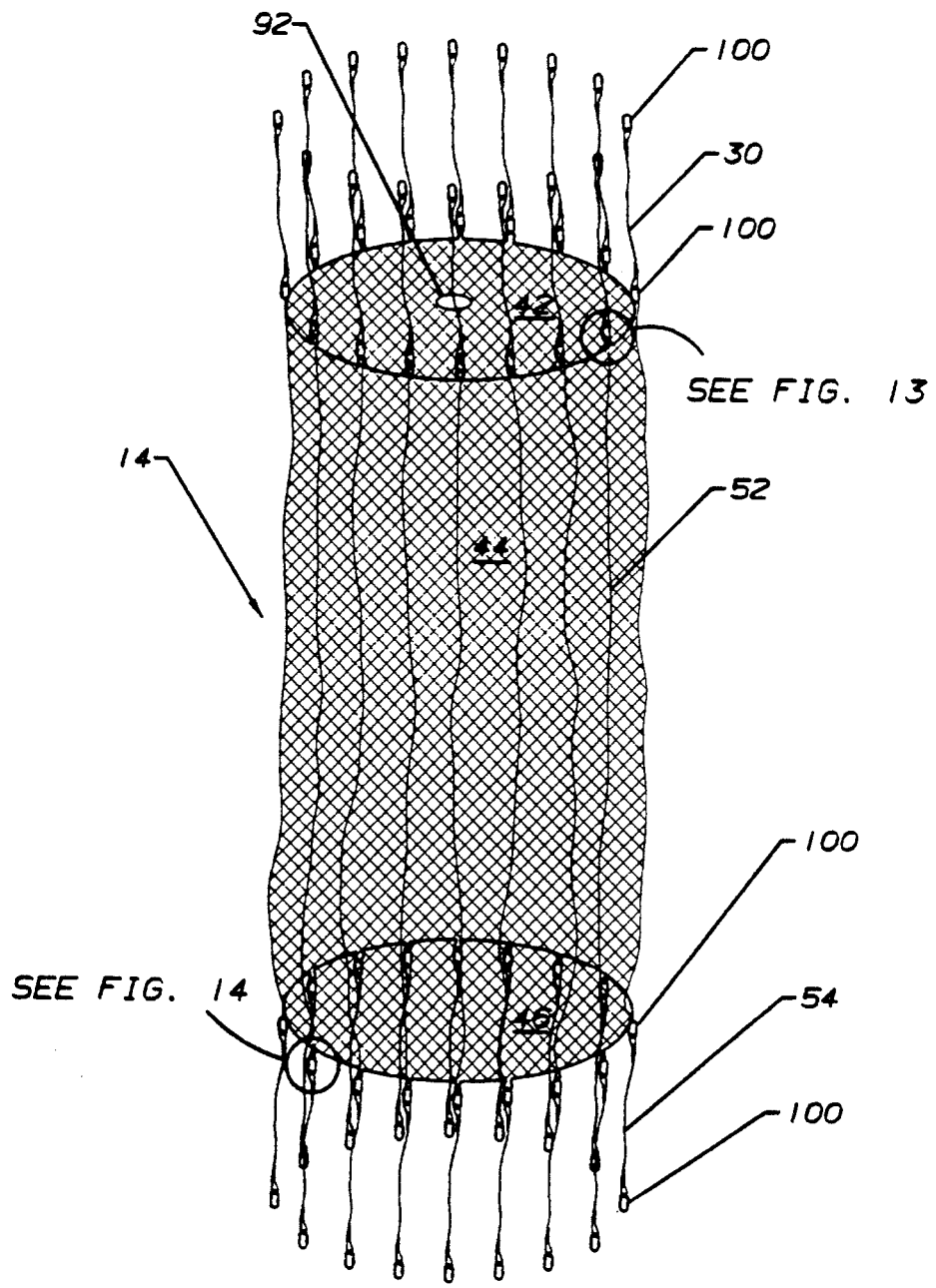
FIG. 12 is a three quarter perspective view of the enclosed net cage of the submergible fish cage of FIG. 1.

Referring to FIG. 12, the enclosed net cage 14 is shown. Preferably the mid-section of the cable 52 is woven into the mesh of the net to strengthen the net and to have the cable support the net. In the approximate center of the top wall 42 of the enclosed net cage, a reinforced opening 92 is provided in the cage to receive the fish feed tube which will be explained hereinafter. In the preferred embodiment of the invention, the cable 18 is composed of three separate cable sections, the top cable section 30 being separate from the middle cable section 52, which in turn is separate from the bottom cable section 54. Referring to FIG. 13, the top end of middle cable section 52 is spliced into the head cable ring 48. The splice is identified as 96. The head cable ring 48 is entwined around thimbles 94. Thimble 94 receives a conventional cable link 100 which can be opened. Link 100 is secured to the bottom end of top cable section 30 through a thimble 94. Both ends of top cable section 30 are spliced to form spliced thimbles 94 in the conventional manner. The ring 100 joins the spliced thimble 94 at the bottom of top cable section 30 with the thimble 94 of head cable ring 48. The top spliced thimble 94 of top cable section 30 (not shown) is secured to the strap 28 (see FIG. 11) by another link 100 which engages grommet 88 and the top spliced thimble 94 in the same manner as the bottom spliced thimble 94 of the top cable section 30 (see FIG. 13) is secured to the spliced thimble 94 of the head cable ring 48.

Referring to FIG. 14, the bottom end of middle cable section 52 is spliced into the bottom cable ring 50 at splices 96. The bottom ring cable 50 is entwined about a plurality of thimbles 94 which are used to attach the anchor or bottom cable sections. The bottom end of the middle cable section 52 is secured to the bottom cable section 54 in a manner similar to the way the top end of middle cable section 52 is secured to the top cable section 30 described above. The bottom cable section 54 has spliced thimbles 94 at both its ends. The top spliced thimble 94 of bottom cable section 54 is secured to the thimble 94 of the bottom ring cable 50 with a link 100 as shown in FIG. 14. The bottom spliced thimble of bottom cable section 54 (not shown) is secured to an anchor weight by another link 100 engaging the bottom spliced thimble of the bottom cable section 54. This type of attachment between the various cable section provides that the cable will not be worn by the relative movement of the flotation ring, the enclosed net cage and the anchor weights and provides for the easy installation, assembly, use and disassembly of the submergible fish cage.

The cables 18 and top and bottom cable rings 48 and 50 are made of conventional materials used in aqueous or marine environment, such as twisted or woven nylon, polyethylene or polypropylene cables. SPECTRA brand and KEVLAR brand synthetic fiber cables and Polydac, Terex, Duralon, Spectron or Polypro brand ropes can be used as cables. These synthetic materials are not corroded by water and they have fairly good resistance to degradation from ultraviolet light and oxygen.

Figure 15:
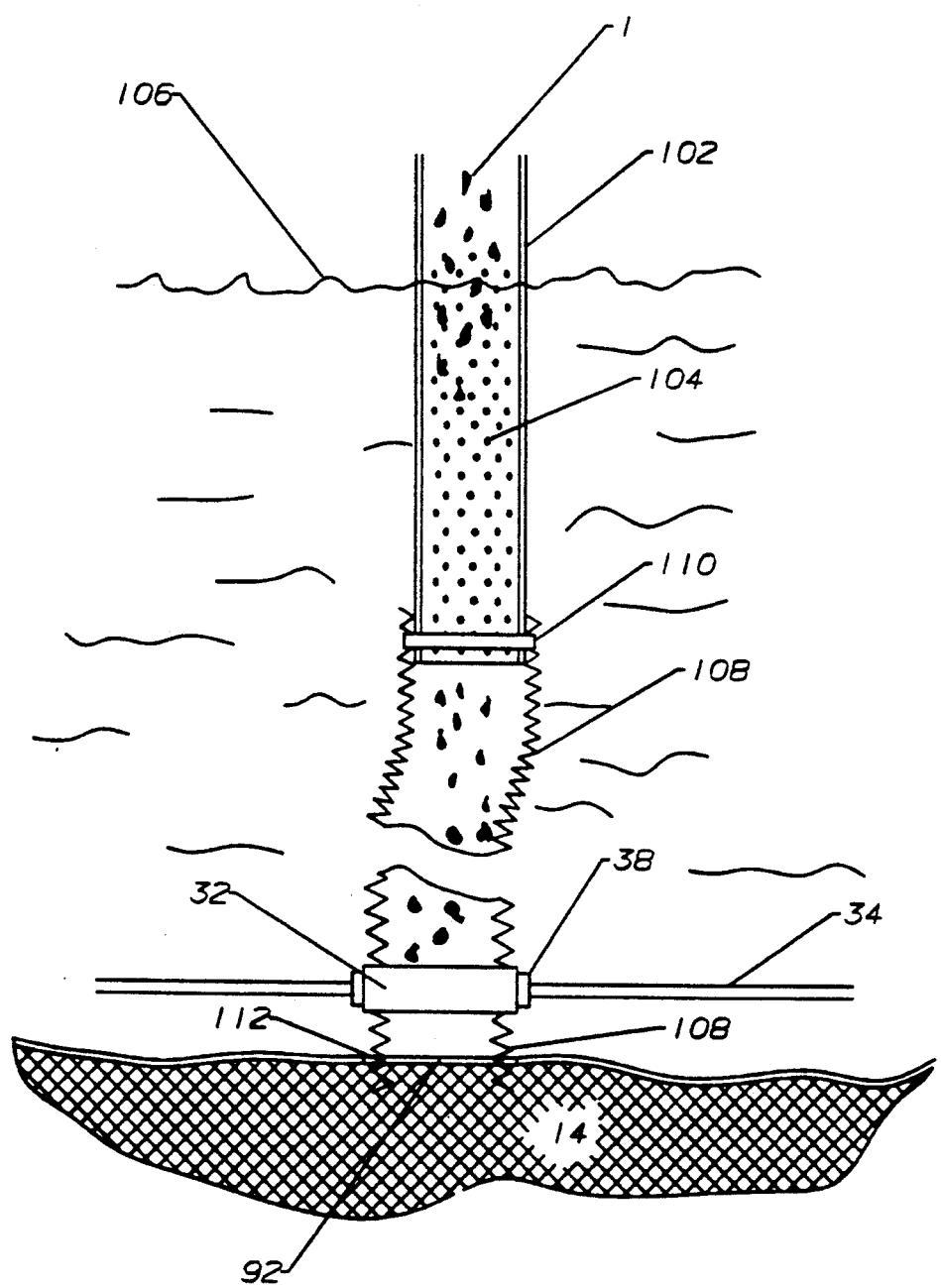
FIG. 15 is a partial sectional view of a portion of the fish feed tube of the submergible fish cage of FIG. 1.
Figure 18:
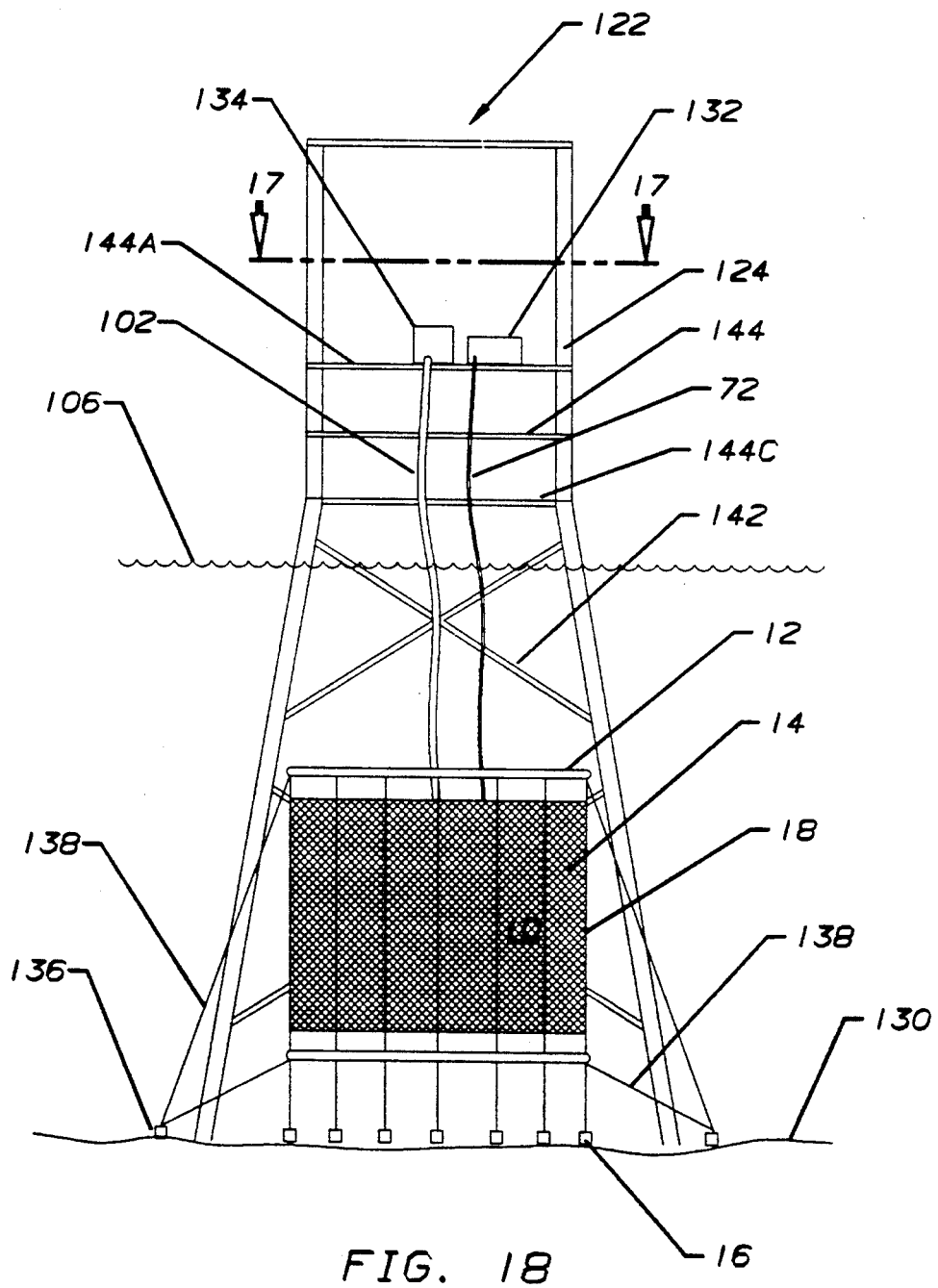
FIG. 18 is plan view of the fish aqua farming system of the present invention.

Referring to FIG. 15, a rigid feed tube 102 descends from a platform, such a platform shown in FIG. 18, into the water above the top wall 42 of the enclosed net cage. The fish feed food or pellets descend a great distance, as much as a hundred feet before reaching the bottom of the feed tube 102. The bottom of the feed tube is flooded level with the water surface 106 of the body of water. The feed pellets, at the interface of the water surface, can compact and plug the feed tube. To prevent such plugging, which is difficult to correct, the bottom of the feed tube is perforated with holes 104 so that the wave action of the body of water is carried into the tube to provide a wave action inside the tube to constantly agitate the feed pellets as they strike and sink into the water within the tube. The bottom of the tube is joined to a flexible hose 108 of approximately the same diameter. The hose is connected to the feed tube with a conventional hose clamp 110. The flexible hose 108 passes through the collar 32 of the flotation ring 12 into the opening 92 in the top wall 42 of the enclosed net cage 14. The opening 92 has a reinforced collar 112 connecting the top wall 42 to the flexible hose 108. The collar 32 aligns the hose 108 with the opening 92 and absorbs most of the forces exerted on the tube and hose by currents, wave action and wind.

Figure 16:
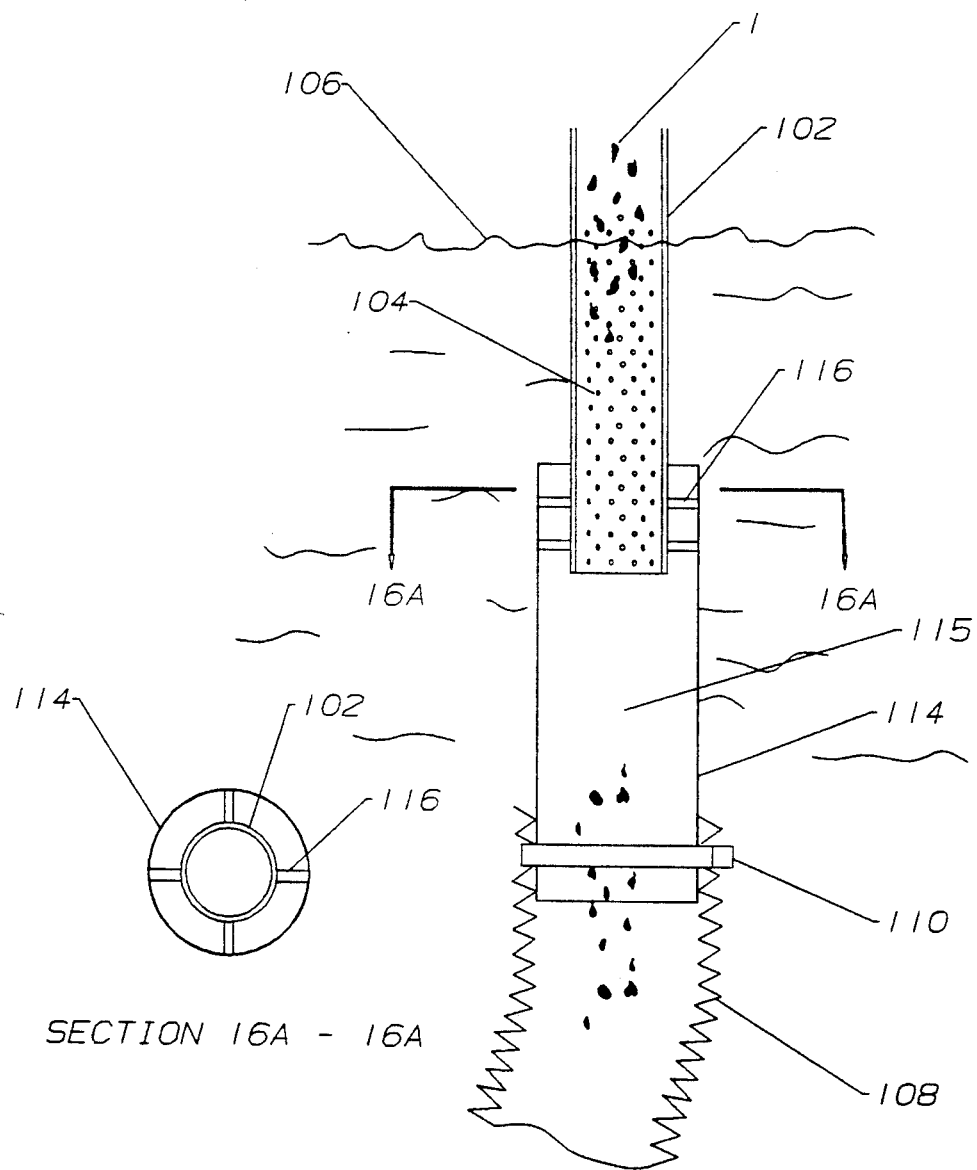
FIG. 16 is a partial sectional view of an alternative fish feed tube of the submergible fish cage of FIG. 1.

Referring to FIG. 16, an alternative embodiment of the feed tube is shown. The rigid feed tube 102 ends within sleeve 114. Sleeve 114 has a larger diameter than rigid tube 102 and sufficient space is provided between tube 102 and sleeve 114 so that water may circulate between the tube and the sleeve and into the sleeve plenum 115. The sleeve and tube are connected by struts 116 which extend around the tube and securely attach the sleeve to the tube. The flexible hose 108 leading to the enclosed net cage is attached to the end of the sleeve by a conventional clamp 110. The connection of the flexible tube 108 with the enclosed net cage is the same as described with respect to FIG. 15. As mentioned above, the fish feed pellets drop a great distance down from the top of the platform to the end of the tube 102. The end of the tube 102 is filled with water. The pellets hitting the surface of the water within the tube can compact and clog the tube. The structure at the end of the tube shown in FIG. 16 provides that the wave action at the surface 106 of the water and the water currents outside the tube are transmitted into the water in the tube and the tube plenum via the space between the exterior of the tube 102 and the interior of the sleeve 114, and the sleeve plenum 115.

Figure 17:
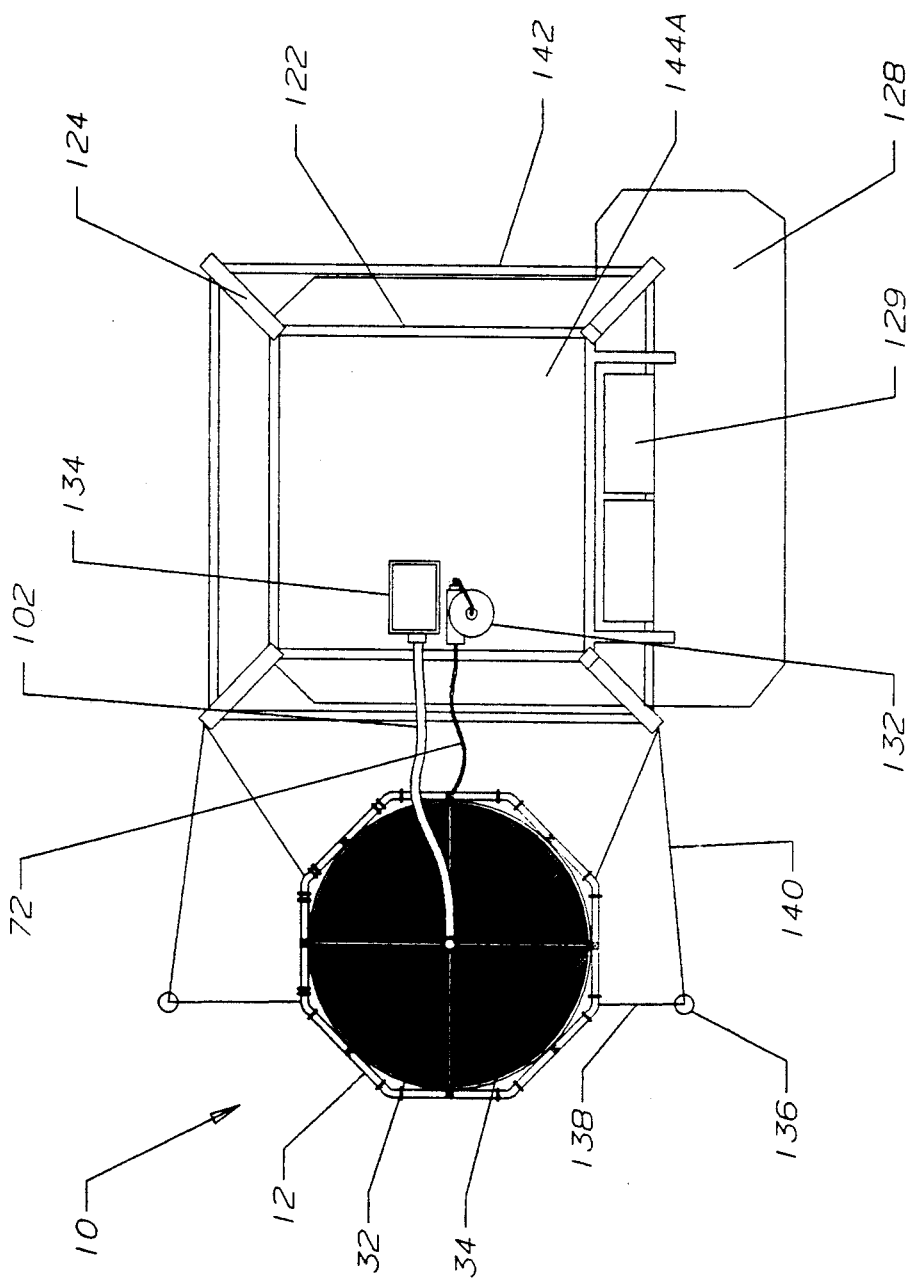
FIG. 17 is a top view of the fish aqua farming system of the present invention.

Referring to FIGS. 17 and 18, non-producing or producing oil platforms 122 make an ideal anchor and base for the submergible fish net system of the present invention. Although all platforms are not constructed identically, the platforms generally have three (3) or more vertical legs 124 laterally braced with cross beams 142. The top of the platform normally has a pad 126 and a helicopter platform 128. In addition, the platforms have a boat landing 129. The platforms normally rest in water at the mean low tide level of 50 feet or more. For the present invention, an air supply system 132 can be secured to one of the decks 144 of the platform, such as deck 144A, and an air hose 72 will connect the supply system with the floatable ring 12 via the air manifold system described above. The air supply system can comprise air pressure tanks (not shown) and valve systems, including a three-way valve (not shown) which permits channeling of air from the air pressurization tanks into hose 72 and permits release of air from the flotation ring through air hose 72. Optionally, the system 132 can include a compressor (not shown) powered by an electrical motor, gasoline motor, diesel motor and the like. In one embodiment, the air supply will be mounted on the inspection boat, feed boat and/or harvesting boat. The system of the present invention also includes a fish feed pellet system 134. Conveniently, a solar powered system can be used such as the solar powered feeder systems available from Lehman Feeder and Plow of Corpus Christi, Tex. The feeder system can be programmed to supply fish food pellets through tube 102 into the closed net cage.

To minimize movement of the submergible fish cage 10 away from or toward the platform, the flotation ring is anchored to embedded sea anchors 136 by lines 138 attached to the sides of the flotation ring. The anchor and anchor cables prevent the submergible fish cage 10 from moving into the platform or moving sideways away from the platform. Additional anchor lines 140 can be run from the sea anchors to the legs 124 of the platform 122. In addition, cables 145 are run from the legs 124 nearest the submergible fish cage to the flotation ring. These cables prevent the submergible fish net from moving directly away from the platform. The anchor and cable system is not designed to tether the submergible fish cage in a taut relationship with the platform, but rather to maintain the relative position of the cage with respect to the platform and yet give the cage some freedom of movement with respect to the platform so that the cage may ride out wave action and currents of the body of water 106.

FIG. 18 illustrates the relative height of the pad 126 and decks 144 to the enclosable net cage 14. The fish feed pellet tube 102 extends from the fish feed system 134 on the deck 144A to the top of the enclosed net cage 14. The air hose 72 extends from the air supply system 132 on top of the deck 144A to the air manifold system of the flotation ring 12 of the submergible fish cage. The assembly of the submergible cage can be done on dry land, and the assembled cage can be towed to the platform. Alternatively, the cage can be assembled on a barge brought in the vicinity of the platform and then lowered into the water by a crane after assembly.

When the submergible fish cage first enters the water, the anchor weights and enclosed net cage sink below the surface of the water due to the weight of the anchor weights. The central chamber 64 of the flotation ring is filled with air, giving the ring high buoyancy which supports the enclosed net cage and the anchor weights. Fingerlings are introduced into the enclosed net cage through a gravity feed tube from an oxygenated fish tank on a barge or boat (not shown) and through the top wall 42 of the enclosed net cage. To prevent escape of the fingerlings, the mesh size of the cage net is about one-half inch. For a net having a diameter of about 40 feet and a height of about 28 feet, the enclosed net cage can be charged with about 17,000 Red Drum fish fingerlings. After the enclosed net cage is charged with fingerlings, air is allowed to escape from the flotation ring through the air manifold system, the air hose 72 and the air supply system 132 through a conventional three-way valve (not shown). As the air escapes from the central chamber, water enters into the central chamber through the water manifold system flooding the central chamber to a point where the combined weight of the enclosed net cage, anchor weights and cables submerge the flotation ring below the water surface 106. The submergible fish cage submerges until the anchor weights touch the bottom of the body of water. At that point, the flotation ring is no longer supporting the anchor weights, but the flotation ring, because of the flotation elements, retains sufficient buoyancy, even when the central chamber is fully flooded with water, to support the enclosed net cage and cables. Thus, the enclosed net cage retains its shape. The flotation ring exerts a force upwardly on the top wall 42 and the side wall 44 of the cage. The bottom wall 46 of the cage and the side of the cage are anchored in position near the bottom of the body of water by the anchor weights.

The feed system is started immediately upon submergence for feeding of the fingerlings. Because the air system only has to be utilized to raise or lower the submergible fish cage, only the fish feed system 134 has to be monitored on a continuous basis. The fish feed system is periodically charged with food either by helicopter or boat. The system is operated on a solar cell system with batteries so that personnel do not have to continuously monitor the system's operation on the platform. Preferably, the feeding system 134 will have a radio transmission system that will be activated upon a malfunction of the fish feed system so that the on-shore operator of the fish farm can be notified promptly by radio of any malfunction and can take corrective measures by sending a repair crew out to the platform by boat or helicopter.

For conditions in the Gulf of Mexico, a submergible fish cage 10 is preferably maintained at least 20 to 30 feet below the water surface 106 depending upon ocean currents to minimize the effect of wave action, winds and currents, and to inhibit raids by pirates who will attempt to harvest the fish on their own. Although the submergible fish cage has been designed to lower the fish cage below the surface of the water with the flotation ring, the submergible fish cage can be utilized in a body of water wherein the flotation ring remains at all times on the surface supporting the fish cage. In that instance, the flotation ring would not be flooded at any point in the operation. Although it is envisioned that in most instances, the submergible fish cage would be utilized in situations where the ring is maintained at a depth of between ten (10) and thirty (30) feet below the surface of the water, there can be instances where the submergible fish cage is submerged to a far greater depth where the flotation ring will be deeper than thirty (30) feet below the water and there can be other instances where the submergible fish cage will be used in fairly shallow bodies of water and the flotation ring will be below the surface but not more than ten (10) feet below the surface. The "deep" submergence of the submergible fish cage also protects it from damage by boats that might come close to the platform.

The submergible net cage can be raised for cleaning, repairs harvesting, stocking and the like. This system is raised by activating the air system. Air is injected into hose 72 by the air supply system. The air enters into the air manifold system described above which in turn introduces the air into the central chamber. The air displaces the water in the central chamber which exits via the water manifold described above. When sufficient water is ejected from the central chamber, the flotation ring 12 has sufficient buoyancy to lift the entire submergible fish cage to the surface 106 of the body of water. That is, the flotation ring will achieve sufficient buoyancy to lift the enclosed net cage 14, the anchor weights 16 and the cables 18. If it is time to harvest the fish within the cage, a barge can be positioned adjacent the flotation ring. Preferably the barge or the platform will have a crane which will be connected to the cables 18. The crane will lift the enclosed net cage out of the water with the fish therein and position the cage over the barge. An enclosure in the bottom of the fish cage (not shown) will be opened, permitting the fish to flow into the barge. After the fish have been removed from the cage, the closure is sealed and the net again positioned in the water. The cage is charged with fingerlings and the entire system is allowed to submerge by permitting air to escape from the flotation ring; thus, allowing water to enter the central chamber to reduce the buoyancy of the flotation ring to a point where it cannot support the anchor weights as well as the cage and cables.

As explained above, the flotation ring, even when the central chamber is fully flooded, will retain sufficient buoyancy because of the flotation elements therein to support the cables and the enclosed net cage. Thus the flotation ring cannot be sunk, i.e. devoid of all buoyancy. If the ring could sink and did sink, the cage would collapse and rest on the bottom of the body of the body of water. This would probably kill or lead to the death of the fish in the cage. The anchor weights force the system to the bottom until the anchor weights are received by the bottom 130 of the bed of the body of water. The anchor weights are spaced apart from the bottom wall of the cage so that the cage does not rest on the bottom. Preferably the cage bottom is spaced at least five feet from the bottom.

In some areas, because of predator fish, the cage may be surrounded by a conventional predator net made of a heavier fiber which prevents barracuda, sharks and other predator fish from attacking or attempting to attack the enclosed net cage 14.

Because the submergible fish net cage is located in open waters where the water is constantly stirring because of currents, wind, wave action and inclement weather, the water the fish are being raised in within the enclosed net cage is constantly changing so that the fish are raised in a near natural environment not polluted by the food supply or the metabolic products of the fish themselves. As with any population, a certain number of fish will die during the growing season. The dead fish will drop to the bottom of the enclosed net cage wherein they will decompose by natural processes. Because of the constant percolation of water through the enclosed net cage in the open body of water, the decomposition products of the dead fish are continuously washed out of the cage so that they do not affect the fish. It has been found that fish raised in open waters have a much faster growth rate than fish raised in ponds and tanks and that the mortality rate of fish grown in open waters is lower than the mortality rate of fish raised in ponds and tanks.

The invention has been described with respect to a octagonal shape flotation ring. The ring can be square shape, pentagonal, hexagonal, heptagonal, circular or the like. The net has been shown to have a general cross-sectional shape consistent with that of the ring. However, the net can have a circular cross section while the flotation ring has a polygonal configuration and vice versa. The flotation ring has also been shown to have a central cavity which extends the full length of the ring. However, the central cavity can be subdivided into sealed sections (not shown), each sealed section preferably containing a flotation element and each sealed section having at least one water port and one air port that are joined to the water manifold and air manifold systems respectively.

Figure 19:
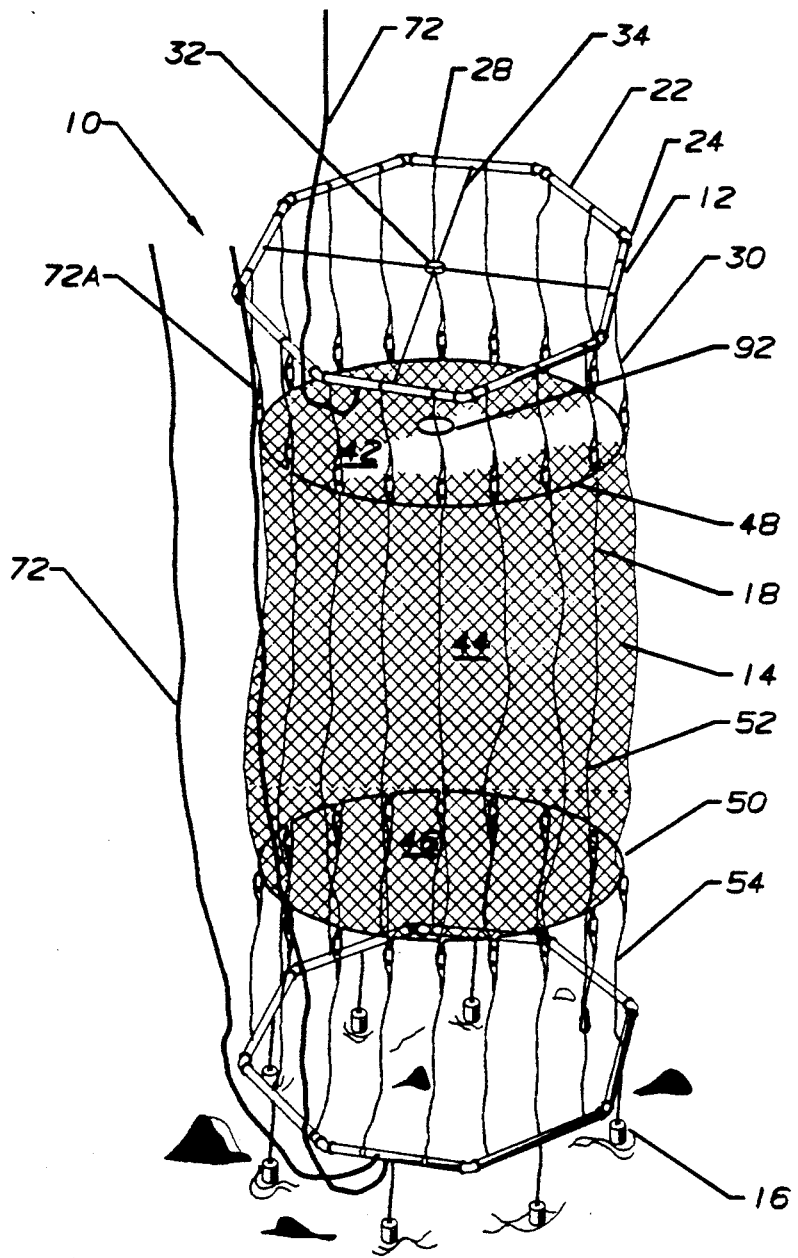
FIG. 19 is a three quarter perspective view of an alternative embodiment submergible fish cage of the present invention.

FIG. 19 illustrates a submergible fish net system wherein the system has two rings. In the two (2) ring submergible fish cage system, the top ring and bottom ring can be similar to flotation ring 12 or one (1) of the rings can be a completely sealed ring having a positive, negative or neutral buoyancy. In a two (2) ring system, the top ring when the system is submerged will have sufficient buoyancy to support the cage, the cables and, optionally, a portion of the bottom ring and/or a portion of the anchor weights. If the bottom ring has a negative buoyancy in the submerged state, then the top ring will have sufficient buoyancy when the system is submerged to support the bottom ring. If the bottom ring has positive buoyancy in the submerged state, then the top ring does not need sufficient buoyancy in the submerged state to support the bottom ring.

In the system where the top ring is similar to flotation ring 12 and the top ring is used to float and submerge the system, the system operates in the same manner as described for the system of FIG. 1 and the bottom ring is merely treated as a structural member which may or may not have positive buoyancy.

In the system where the bottom ring is used to submerge or float the system, the top ring will always have a positive buoyancy to maintain the shape of the fish cage between the bottom ring and top ring. The top ring will have sufficient buoyancy at all times to float itself, the fish cage and aid in the flotation of the bottom ring and anchor weights. The bottom ring in its flooded state and fully buoyant state will have insufficient buoyancy to lift itself as well as the anchor weights. However, when the bottom ring is filled with air expelling the water, the buoyancy of the bottom ring together with the buoyancy of the top ring will be sufficient to float itself and the anchor weights thus allowing the submergible fish cage to raise to the surface. The bottom ring in its buoyant condition provides the additional buoyancy needed for flotation of the anchor weights and the ring itself to the point where the entire system may float to the top surface. However, the bottom ring when fully buoyant does not have sufficient buoyancy itself to lift itself and the anchor weights to the surface. The buoyancy of the two rings is needed to float the submergible fish cage. Thus the bottom ring and anchor weights always exert a downward force on the top ring. This is necessary to maintain the shape of the enclosed net cage.

I claim:

1. A submergible fish cage comprising:
   an enclosed net cage having a side wall, a contiguous top wall and a contiguous bottom wall;
   a hollow ring having at least one central chamber within the length of the ring, a plurality of water openings on the bottom of the ring for fluid communication between each central chamber and the exterior of the ring, and a plurality of inlets on the ring in fluid communication with each central chamber for introducing air into or evacuating air out of each chamber;
   at least one floatation element positioned within one of the central chambers, each flotation element having positive buoyancy in water, the at least one floatation element giving the ring sufficient buoyancy when each central chamber of the ring is fully flooded with water to support the ring and the enclosed net cage;
   a plurality of anchor weights, sufficient anchor weights being employed so that anchor weights will submerge the ring and enclosed net cage when each central chamber of the ring is flooded with water; and
   a plurality of cables attached at their upper ends to the ring, the middle portion of each cable attached to the enclosed net cage and the bottom end of each cable below the bottom wall of the enclosed net cage attached to the anchor weights, the ring having sufficient buoyancy when water is expelled from the central chambers to rise to the surface of the water supporting the enclosed net cage, anchor weights and cables.

2. The submergible fish cage according to claim 1 wherein the ring has a support collar positioned approximately in the center thereof with at least three support arms extending from the ring to the support collar, the collar adapted to receive a fish feed tube which is connected to the top wall of the enclosed net cage for introducing fish food into the cage.

3. The submergible fish cage according to claim 1 wherein the enclosed net cage has a cable ring at the juncture of the top wall with the continuous side wall of the enclosed net cage, the cables attached to the ring being secured to the cable ring and the cable ring being secured to the cables attached to the anchor weights.

4. The submergible fish cage according to claim 1 wherein the enclosed net cage has a cable ring at the juncture of the bottom wall with the continuous side wall of the enclosed net cage, the cables attached to the ring being secured to the cable ring and the cable ring being secured to the cables attached to the anchor weights.

5. The submergible fish cage according to claim 1 including an air manifold system for the ring comprising the plurality of inlets in the ring, at least one inlet in communication with each central chamber and the air manifold system which is connected to an air supply system which can introduce air into the manifold system to deliver air into each chamber to expel water from each chamber through the water openings and which can permit the evacuation of air from each central chamber to permit water flooding of each chamber through the water openings.

6. The submergible fish cage according to claim 1 including a water manifold system which includes the plurality of openings in the ring, at least one opening in communication with each chamber and with the water manifold system which is in communication with the exterior of the ring and which permits water to enter into the manifold system and enter into each chamber and which permits the expulsion of water from each chamber as air is injected into each chamber.

7. The submergible fish cage of claim 1 wherein the flotation ring has one chamber extending the length thereof.

8. A submergible ring for a fish cage comprising:
a plurality of hollow cylindrical straight sections connected together by a like plurality of hollow elbows, the end of each section connected to an end of a separate elbow to form a continuous ring each straight section having a central chamber, the ring adapted to be attached to, and to support, a fish net cage;
a plurality of flotation elements positioned within the central chamber of the straight sections, the flotation elements distributed evenly about the ring;
one or more sections each having a port and air inlet, each port in communication with the central chamber of the section and the exterior of the ring to permit water to enter into the central chamber when air is removed from the chamber and to permit the expulsion of water from the central chamber when air is introduced in the chamber;
each air inlet in communication with the central chamber of the section for introducing air into the central chamber to expel water from the central chamber and to permit evacuation of air from the central chamber to permit the entrance of water into the central chamber;
when the ring is attached to a fish net cage, the flotation elements having sufficient buoyancy to at least float the ring with the attached fish net cage when each central chamber is fully flooded with water, and
the ring having sufficient buoyancy when water is expelled from each central chamber to raise the ring attached to the fish net cage, cables and anchor weights to the surface of the water.

9. The flotation ring according to claim 8 wherein the ends of each straight section are butt welded to the ends of the elbows.

10. The flotation ring according to claim 8 wherein the flotation elements comprise a hollow pipe-shaped element having an OD diameter less than the ID diameter of the central chamber, the ends of the pipe-shaped element being sealed off with caps.

11. The flotation ring according to claim 8 wherein the ports of alternating straight sections are connected to a water manifold system, the central chambers of all straight sections being in fluid communication, the manifold system having at least one outlet to the exterior for expelling water from the central chambers when air is introduced into the central chambers and for allowing water to enter the central chambers when air is evacuated from the central chambers.

12. The flotation ring according to claim 8 wherein the air inlets of alternating straight sections are connected to an air manifold system, the central chambers of all straight sections being in fluid communication, the manifold system having at least one air port for injecting air into and evacuating air out of the central chambers via the air manifold system.

13. The device according to claim 8 wherein a cylindrical collar is positioned in the approximate middle of the ring, the collar being supported by at least three struts extending from the wall of the ring to the exterior wall of the sleeve to secure and position the collar.

14. The flotation ring according to claim 8 wherein the ring is made of eight straight sections which are connected and assembled into a ring by eight 45° elbows secured to the ends of the straight sections.

15. The device according to claim 8 including a plurality of straps secured around the straight sections about the ring, the ends of the straps having a grommet to which attachment means for the fish net cage and the anchor weights are attached.

16. An aqua farming system for a body of water comprising:
a platform extending above the surface of the body of water;
an air system located on the platform;
a fish feed system for supplying fish feed to the fish;
an enclosed net cage for impounding a plurality of fish for raising the fish for harvest;
a fish feed tube connecting the fish feed system and the enclosed net cage to convey fish feed from the fish feed system to the interior of the cage; and
lines connecting the enclosed net cage and the platform and lines connecting the enclosed net cage and anchors embedded in the bottom of the body of water to maintain the relative position of the enclosed net cage with the platform.

17. The aqua farming system of claim 16 wherein the enclosed cage comprises:
an enclosed net cage having a side wall, a contiguous top wall and a contiguous bottom wall;

a hollow ring having at least one chamber within the length of the ring, a plurality of water openings on the bottom of the ring for fluid communication between each chamber and the exterior of the ring, and a plurality of air inlets on the ring in fluid communication with each chamber for introducing air into or evacuating air out of each chamber;

at least one flotation element positioned within at least one chamber of the ring, each flotation element having positive buoyancy in water, the flotation elements giving the ring sufficient buoyancy when each chamber of the ring is fully flooded with water to support the ring and the enclosed net cage;

a plurality of anchor weights, sufficient anchor weights being employed so that anchor weights will submerge the ring and enclosed net cage when the chambers of the ring are fully flooded; and a plurality of cables attached at their upper end to the ring, the middle portion of the cable attached to the enclosed net cage and the bottom end of the cables below the bottom wall of the enclosed cage attached to the anchor weights, the ring having sufficient buoyancy with water is expelled from the central chamber to rise to the surface of the water with the enclosed net cage, anchor weights and cables.

18. The aqua farming system according to claim 17 wherein the enclosed net cage has a cable ring at the juncture of the top wall with the continuous side wall of the enclosed net cage, the cables attached to the ring being secured to the cable ring and the cable ring being secured to the cables attached to the anchor weights.

19. The submergible fish cage according to claim 17 wherein the enclosed net cage has a cable ring at the juncture of the bottom wall with the continuous side wall of the enclosed net cage, the cables attached to the ring being secured to the cable ring and the cable ring being secured to the cables attached to the anchor weights.

20. The aqua farming system according to claim 17 including an air manifold system for the ring comprising the plurality of air inlets in the ring, at least one air inlet in communication with each chamber and in communication with the air manifold system which is connected to an air pump system which can introduce air into the manifold system to deliver air into each chamber to expel water from each chamber through the water openings and which can permit the evacuation of air from the central chamber to permit water flooding of each chamber through the openings.

21. The aqua farming system according to claim 17 including a water manifold system which includes the plurality of water openings in the ring, the water manifold system being in communication with the exterior of the ring to permit water to enter into the manifold system and enter into each chamber and to permit the expulsion of water from each chamber through the water manifold system as air is injected into each chamber.

22. The aqua farming system of claim 17 wherein the hollow ring has one chamber extending the length thereof.

23. A submergible fish cage comprising:

ring shaped float having at least one central chamber; a non-rigid fish cage positioned below the float; at least one (1) anchor weight; and at least one (1) cable, one end of each cable attached to the float, a middle portion of said at least one cable attached to the fish cage, the bottom end of said at least one cable attached to at least one anchor weight, the at least one cable being shorter than the depth of the water in which the submergible fish cage is placed; at least one central chamber of the float adapted to be flooded with water and adapted to be blown free of water with air, at least one central chamber of the float containing at least one buoyancy element; at least one buoyancy element having a minimum buoyancy sufficient to float itself and the float supporting the fish cage and the at least one cable when the at least one central chamber is flooded with water, the float having a maximum buoyancy sufficient to float itself supporting the fish cage, the at least one anchor weight and the at least one cable when the at least one central chamber is charged with air; and the at least one anchor weight having sufficient weight to submerge the float, cage, the at least one cable and itself when the at least one central chamber is flooded with water.

* * * * *